H. W. PLEISTER.
CABLE CLAMP AND BRIDLE RING.
APPLICATION FILED OCT. 4, 1919.
1,365,611.
Patented Jan. 11, 1921.
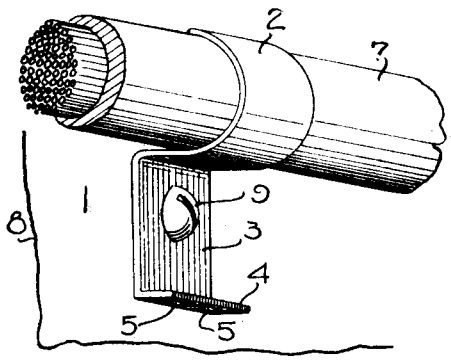
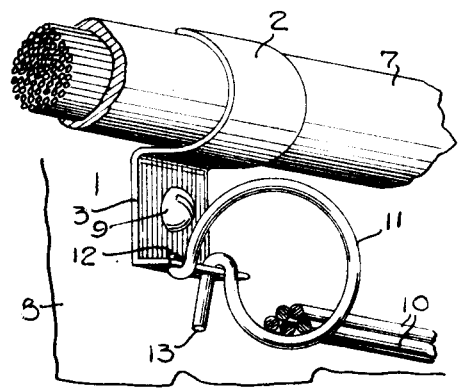
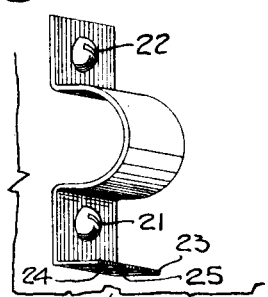
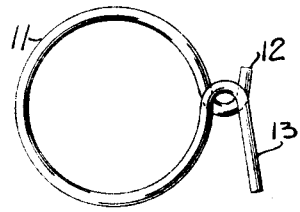
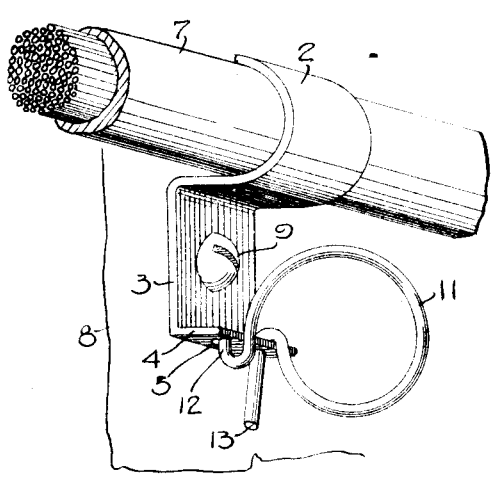
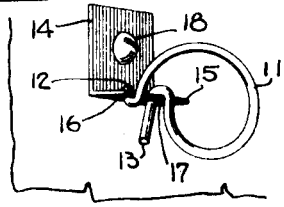

UNITED STATES PATENT OFFICE.

HENRY W. PLEISTER, OF WESTFIELD, NEW JERSEY, ASSIGNOR TO HENRY B. NEWHALL, JR., EXECUTOR OF HENRY B. NEWHALL, DECEASED.

CABLE-CLAMP AND BRIDLE-RING.

1,365,611.     Specification of Letters Patent.     Patented Jan. 11, 1921.

Application filed October 4, 1919. Serial No. 328,520.

*To all whom it may concern:*

Be it known that I, HENRY W. PLEISTER, a citizen of the United States, residing at Westfield, in the county of Union and State of New Jersey, have invented certain new and useful Improvements in Cable-Clamps and Bridle-Rings, of which the following is a specification, taken in connection with the accompanying drawings.

My invention relates to the combination of a conduit and cable clamp and bridle ring, and also to a cable or conduit clamp and a bridle ring as sub-combinations of the main combination, and as articles of manufacture.

My invention further relates to a cable and conduit clamp, which can be manufactured at minimum expense and to which a bridle ring may be secured either at the original installation of the cable and conduit clamp, or at any future time when it may be desirable to support one or more runs of bridle wires.

My invention further relates to a nonthreaded bridle ring, which may be used in combination with the conduit or cable clamp or independently. It further relates to such a bridle ring, which can be formed of relatively small gage wire. It further relates to such a bridle ring, which will form a complete closed loop around the bridle wire, or strands of bridle wires, and thereby prevent any accidental disengagement of the bridle wire from the bridle ring.

My invention further relates to certain combinations, sub-combinations, articles of manufacture, and details of construction, all of which will be more fully hereinafter described and pointed out in the claims.

In the figures, in which I have shown one embodiment of my invention, the same reference numerals refer to similar parts in the several figures.

Figure 1 is a perspective view of my conduit and cable clamp and a cable which it supports;

Fig. 2 is a perspective view similar to Fig. 1, but with the addition of my bridle ring, which is shown supporting loose bridle wires;

Fig. 3 is a detail view of my bridle ring;

Fig. 4 is a perspective view, similar to Fig. 2, but showing the manner of snapping the bridle ring into the conduit or cable clamp;

Fig. 5 is a modification in which a support is used with my bridle ring so that it can carry runs of bridle wire independent of the clamp;

Fig. 6 is a perspective view of another modification showing my invention applied to a two-hole cable and conduit clamp.

Previous to my invention bridle rings have been used with conduit and cable clamps. These bridle rings are what are known as "pig-tail", having one of their ends provided with machine screw threads to coöperate with machine female screw threads in the heel of the cable clamp. This has necessitated an extra thickness of metal in the heel of the conduit or cable clamp so as to provide sufficient female threads to support the shank of the commercial pig-tail bridle ring. When the cable clamp was formed of sheet metal the customary way to get this additional thickness of metal in the heel was to bend over sufficient additional metal to double the thickness of the metal in the heel. This necessitated the use of a large additional quantity of sheet metal with the consequent increase in cost of the resulting cable or conduit clamp. Attempts have been made to secure the conduit or cable clamp to a wall or other support by means of a pig-tail bridle ring provided with wood screw threads, but it has been found that in practice this is not satisfactory.

A bridle ring provided with wood screw threads can be used separately in wood but cannot be used successfully as a supporting means for the cable clamp. A bridle ring provided with a machine screw threads can be used on a cable clamp, which has had its heel thickened and tapped with machine screw threads, but such a bridle ring provided with machine screw threads cannot be used independently in a wood or stone structure to support one or more bridle wires.

By my invention my bridle ring may be used with a conduit or cable clamp, or may be used independently with a support to secure strands or runs of bridle wire on a wall or other support.

In the commercial use of conduit and cable clamps it is not generally possible, at the date of the original installation, to determine whether or not bridle rings will be needed to support additional loose strands of bridle wires. In commercial practice, a cable is supported on a wall or other suitable support and it may be weeks, months, or years later that the telephone engineers will determine that it is desirable to support bridle wires parallel to the cable.

By my invention my conduit and cable clamp may be used as a separate article of manufacture or sub-combination, and then later, when the needs of the service demands it, my bridle ring may be supported by the same conduit or cable clamp, when the complete combination would be used.

In my invention I make my cable or conduit clamp 1 of one thickness of metal, preferably sheet metal, having a hook portion 2, a heel 3, and provide the heel with a flange 4, having locking surfaces, as for example, openings 5 and 6. The cable or conduit 7 is secured to the wall or other support 8 by means of a single screw 9.

Weeks, months, or years later, when the exigencies of the service may demand one or more bridle wires 10, 10 to be strung parallel to the cable 7, it is only necessary by my invention to hook my bridle ring 11 into the locking surfaces 5 and 6 of the conduit and cable clamp 1 and then string the run of bridle wires through the bridle ring.

To obtain the engaging surfaces on the ring to coöperate with the engaging surfaces 5 and 6 on the clamp, I preferably bend back a portion of the bridle ring 11, forming arms 12 and 13. Preferably one of the arms is longer than the other. In positioning the bridle ring the longer arm 13 is first threaded through the opening 6 and then the bridle ring is compressed slightly, Fig. 4, so as to permit the arm 12 to be forced beneath the flange 4. This will then, by simple manipulation, permit the end of the arm 12 to snap into the opening 5 when the bridle ring 11 will be securely held to the conduit or cable clamp 1, as shown in Fig. 2. The longer arm 13 bears against the wall or support 8, and serves to hold the bridle ring in its proper position with relation to the conduit or cable clamp 1. Should it ever be desirable, at some future time, to remove the bridle ring it is simply necessary to compress the ring 11, to free the end 12 from the hole 5 when the bridle ring can be readily removed from the cable or conduit clamp 1.

In some cases it may be desirable to use my bridle ring 11 to support bridle wires on a wall without using a cable clamp such as 1. I have shown in Fig. 5 a modification in which a support 14, having a flange 15 and provided with holes 16 and 17, may be employed. The support is held by means of a screw 18 similar to screw 9 in the other form.

My invention is also adapted for a two-hole cable clamp such as 20, Fig. 6, having two holes 21, and 22 to coöperate with two screws. This form is provided with a flange 23, having openings 24 and 25, to coöperate with the ends 12 and 13 of the bridle ring 11 in the same manner as described for the preferred form.

Having thus described this invention in connection with an illustrative embodiment thereof, to the details of which I do not desire to be limited, what is claimed as new and what is desired to secure by Letters Patent is set forth in the appended claims.

What I claim is:—

1. A conduit and cable clamp formed from sheet metal having a single thickness of metal for both the heel and hook portions, and provided with a flange having locking surfaces to receive the two ends of a bridle ring.

2. A conduit and cable clamp formed from sheet metal having a single thickness of metal for both the heel and hook portions, and provided with a flange having locking surfaces to receive the two ends of a bridle ring, and a bridle ring.

3. A conduit and cable clamp provided with a flange having non-threaded locking surfaces to support a non-threaded bridle ring, and a non-threaded bridle ring having arms coöperating with the non-threaded locking surfaces of the flange one of the arms being adapted to bear against the wall or other support.

4. A new article of manufacture comprising a spring bridle ring forming substantially a closed circle the two ends of the bridle ring being bent at an angle to hook into two holes in a cable or conduit clamp one of the arms being longer than the other to bear against a wall or other support.

5. A new article of manufacture comprising a bridle ring support having openings to receive the two arms of a bridle ring, and a bridle ring having arms to coöperate with the openings in the support, one of the arms being longer than the other to bear against a wall or other support to steady the bridle ring.

6. A conduit or cable clamp provided with a hook portion and a base, the base being provided with a flange having openings to receive the ends of a bridle ring.

7. A conduit or cable clamp provided with a hook portion and a base, the base being provided with a flange at its lower end having openings to receive the ends of a bridle ring.

8. A conduit or cable clamp formed from sheet metal having a hook portion and a base, a portion of the base being bent out to form a flange, said flange being provided with openings.

9. The combination of a conduit or cable clamp provided with a hook portion and a base, the base being provided with a flange having openings to receive the ends of a bridle ring, and a bridle ring having its ends mounted in the openings in said flange.

10. The combination of a conduit or cable clamp provided with a hook portion and a base, the base being provided with a flange having openings to receive the ends of a bridle ring, and a wire bridle ring formed by bending a piece of wire on itself, the two ends being provided with means to coöperate with the openings in the flange.

HENRY W. PLEISTER.

Witnesses:
A. M. WILLIAMS,
M. R. RYAN.